US012017886B2

(12) United States Patent
Haikonen et al.

(10) Patent No.: US 12,017,886 B2
(45) Date of Patent: Jun. 25, 2024

(54) ELEVATOR SHAFT ELEMENT, ELEVATOR ARRANGEMENT AND METHOD

(71) Applicant: Kone Corporation, Helsinki (FI)

(72) Inventors: Aki Haikonen, Helsinki (FI); Anssi Venho, Helsinki (FI); Jukka Laitinen, Helsinki (FI); Markku Haapaniemi, Helsinki (FI); Matti Rasanen, Helsinki (FI); Tapani Talonen, Helsinki (FI); Ville Myyrylainen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/154,287

(22) Filed: Jan. 13, 2023

(65) Prior Publication Data

US 2023/0142195 A1 May 11, 2023

Related U.S. Application Data

(63) Continuation of application No. PCT/FI2021/050563, filed on Aug. 20, 2021.

(30) Foreign Application Priority Data

Aug. 21, 2020 (EP) .................................... 20192086

(51) Int. Cl.
*B66B 11/00* (2006.01)
*B66B 5/00* (2006.01)
(Continued)

(52) U.S. Cl.
CPC ........ *B66B 11/0005* (2013.01); *B66B 5/0056* (2013.01); *B66B 5/0087* (2013.01);
(Continued)

(58) Field of Classification Search
CPC . B66B 11/0005; B66B 5/0056; B66B 5/0087; B66B 13/30; B66B 19/00; B66B 2201/30; B66B 9/187
See application file for complete search history.

(56) References Cited

U.S. PATENT DOCUMENTS 4,231,148 A * 11/1980 Harding ................ E04F 17/005 29/469
4,986,041 A * 1/1991 Prewer .................. E04F 17/005 52/270

(Continued)

FOREIGN PATENT DOCUMENTS

NL 2002869 C * 11/2010 ............. B66B 19/00
NL 2005305 C * 3/2012 ............. B66B 9/187

OTHER PUBLICATIONS

Tomlinson, Angie. "North Sydney Heritage Warehouse Offices Bay 9 Built on History of Sydney Harbour Bridge" Apr. 16, 2019. https://www.commercial <http://www.commercial>realestate.com/au.

(Continued)

*Primary Examiner* — Michael A Riegelman
(74) *Attorney, Agent, or Firm* — Harness, Dickey & Pierce, P.L.C.

(57) ABSTRACT

An elevator shaft element, an elevator arrangement and a method. The elevator shaft element comprises a frame module arranged for receiving an elevator car therein. The frame module is constructed from a transport and/or storage unit, comprising side walls, a bottom wall and a roof wall. The unit is arranged to be positioned vertically such that said side walls, bottom wall and upper wall of the unit define an inner space of the elevator shaft. Elevator car guides for guiding movement of the elevator car in the elevator shaft element are attached to said bottom wall and/or roof wall.

17 Claims, 5 Drawing Sheets

(51) Int. Cl.
*B66B 13/30* (2006.01)
*B66B 19/00* (2006.01)

(52) U.S. Cl.
CPC .............. *B66B 13/30* (2013.01); *B66B 19/00* (2013.01); *B66B 2201/30* (2013.01)

(56) References Cited

U.S. PATENT DOCUMENTS 5,012,621 A * 5/1991 Power ................. E04B 1/34869 52/745.03
6,079,520 A * 6/2000 Black ...................... B66B 19/00 187/241
8,800,724 B1 * 8/2014 Foster ..................... B66B 19/00 187/414
8,800,725 B2 * 8/2014 Alois .................... E04F 17/005 29/469
9,850,653 B1 * 12/2017 Gerard .................. E04F 17/005
10,981,752 B2 * 4/2021 Witczak .............. B66B 11/0407
2007/0084135 A1 * 4/2007 Ritter .................... E04B 1/3444 52/79.1
2008/0099283 A1 * 5/2008 Reigwein ............ B66B 11/0005 187/239
2012/0168263 A1 * 7/2012 Alois .................... B66B 19/002 52/745.03
2015/0337527 A1 * 11/2015 Wallance ............ E04B 1/34384 52/79.9
2018/0127242 A1 * 5/2018 Witczak .............. B66B 11/0005
2020/0217087 A1 * 7/2020 Greschbach ........ B66B 11/0005
2022/0024723 A1 * 1/2022 Laitinen .................. B66B 19/00

OTHER PUBLICATIONS

International Search Report PCT/ISA/210 for International Application No. PCT/FI2021/050563 dated Nov. 18, 2021.
Written Opinion PCT/ISA/237 for International Application No. PCT/FI/2021/050563 dated Nov. 18, 2021.

* cited by examiner

ELEVATOR SHAFT ELEMENT, ELEVATOR ARRANGEMENT AND METHOD

CROSS-REFERENCE TO RELATED APPLICATION

This application is a continuation of PCT International Application No. PCT/FI2021/050563 which has an International filing date of Aug. 20, 2021, and which claims priority to European Patent Application No. 20192086.5 filed Aug. 21, 2020, the entire contents of both of which are incorporated herein by reference.

BACKGROUND

The invention relates to an elevator shaft element.

The invention further relates to an elevator arrangement.

The invention still further relates to a method for constructing an elevator shaft.

A problem with known elevator shafts and elevators is that building thereof takes a long time, including e.g. pouring of concrete etc. Furthermore, if there is a need for demolishing the elevator shaft and elevator, it is a burdensome work.

BRIEF DESCRIPTION

Viewed from a first aspect, there can be provided an elevator shaft element, comprising a frame module arranged for receiving an elevator car therein, the frame module constructed from a transport and/or storage unit, comprising side walls, a bottom wall and a roof wall, the unit arranged to be positioned vertically such that said side walls, bottom wall and upper wall of the unit define an inner space of the elevator shaft, and elevator car guides for guiding movement of the elevator car in the elevator shaft element, said elevator car guides attached to said bottom wall and/or roof wall.

Thereby an elevator shaft element being easy and fast to construct and demolish may be achieved.

Viewed from a second aspect, there can be provided an elevator shaft arrangement, comprising an elevator shaft, comprising at least two shaft elements as defined above.

Thereby an elevator shaft being easy and fast to construct and demolish may be achieved.

Viewed from a further aspect, there can be provided a method for constructing an elevator shaft, the method comprising prefabricating elevator shaft elements, the element comprising a frame module constructed from a transport and/or storage unit, comprising side walls, and a bottom wall and a roof wall, attaching elevator car guides to said bottom and/or roof walls for guiding an elevator car to move in longitudinal direction of all the side walls, bottom wall and roof wall, and arranging a number of said elevator shaft elements one after another until the required length for the elevator shaft has been reached.

Thereby a method for constructing an elevator shaft being fast and economically tempting may be achieved.

The arrangement and the method are characterised by what is stated in the independent claims. Some other embodiments are characterised by what is stated in the other claims. Inventive embodiments are also disclosed in the specifica-tion and drawings of this patent application. The inventive content of the patent application may also be defined in other ways than defined in the following claims. The inventive content may also be formed of several separate in-ventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In an embodiment, the frame module is arranged to constitute an inner perimeter and an outer perimeter of a load bearing structure adapted for bearing the loads caused by operating the elevator. An advantage is that an elevator shaft that is able to be constructed quickly and with low cost may be achieved.

In an embodiment, the bottom and/or roof walls, i.e. structures where the elevator car guides are attached, have a thicker structure than the side walls. An advantage is that it is optimized the utilization of the structure of the transport and/or storage unit by attaching the guides to the most stable part thereof.

In an embodiment, the frame module is constructed from a shipping container. An advantage is that shipping containers have a very strong structure and, furthermore, they are easily available all over the world.

In an embodiment, one or more door openings for a landing door is/are arranged on at least one of the side walls, bottom and roof walls, preferably on one of the side walls. The door openings can be easily and precisely made in the frame module.

In an embodiment, wherein at least one of the side walls comprises at least one opening for receiving a window. An advantage is that e.g. a scenic elevator may be provided.

In an embodiment, the elevator shaft element comprises a maintenance door for maintenance operations to be carried out in the elevator shaft. An advantage is that an access inside the elevator shaft may be provided.

In an embodiment, the maintenance door comprises a door leaf opening inwards and/or outwards in respect of the elevator shaft element. An advantage is that the door leaf can be attached to the frame module in a simple way.

In an embodiment, the door leaf is arranged to open at least inwards, and that the door leaf is provided with a buffer that extends vertically over the upper end of the door leaf, and a support element that is arranged to support the door leaf against a bottom structure of the elevator shaft, and wherein the door leaf is dimensioned for carrying loads caused by the elevator car moving downwards by the nominal speed thereof and loaded by 120% of the nominal load thereof. An advantage is that a safe space in the lower end of the elevator shaft is achieved in a simple way.

In an embodiment, the elevator shaft element comprises a safety buffer arrangement arranged to be moved on movement path of the elevator car when activated by a safety control system. An advantage is that a safe space in the lower end of the elevator shaft is achieved in a simple way.

In an embodiment, the elevator shaft element comprises a machinery for driving moving elevator components, said moving elevator components comprising at least the elevator car). An advantage is that the machinery can be added to the elevator shaft simply by adding the elevator shaft element comprising the machinery.

In an embodiment, the machinery is attached to the elevator car guide. An advantage is that e.g. a low headroom-type elevator can be realized.

In an embodiment, the elevator arrangement comprises at least two elevator shafts arranged side by side, and, optionally, at least one insulator layer arranged therebetween. An advantage is that capacity of the elevator arrangement can be increased in a simple way.

In an embodiment, the elevator arrangement comprises an elevator shaft element comprising a machinery for driving moving elevator components as the upmost elevator shaft element, and an elevator shaft element comprising a maintenance door for maintenance operations carried out in the elevator shaft as the lowest elevator shaft element. An advantage is that a complete elevator shaft having a commonly used configuration may be constructed.

In an embodiment, the method comprises removing an end wall of the transport and/or storage module at least in an end to be connected to another transport and/or storage module.

An advantage is that a basic form of an elevator shaft element is easily achieved.

In an embodiment, the method comprises making one or more door openings on at least one of the side walls, bottom and roof walls, preferably on one of the side walls, and optionally arranging a door leaf in the door opening. An advantage is that the door openings can be easily and precisely made in the frame module.

In an embodiment, the method comprises making at least one opening for a window on at least one of the side walls, and optionally arranging a window element in said opening. An advantage is that e.g. a scenic elevator may be manufactured.

In an embodiment, the method comprises performing a preliminary assembling of the elevator shaft in a plant, factory, manufacturing site or assembly plant, the preliminary assembling comprising arranging at least two of said number of the elevator shaft elements one after another, carrying out at least one assembly work step in the elevator shaft elements, and disassembling the at least two of said number of the elevator shaft elements for transportation to a building site. An advantage is that adjustment and installation work taking place at the building site may be reduced.

In an embodiment, the method comprises vertical alignment of the elevator car guides of the at least two elevator shaft elements to each other in a preliminary assembling. An advantage is that adjustment work of the guides taking place at the building site may be reduced.

In an embodiment, the method comprises arranging at least two elevator shafts side by side, and optionally fitting at least one insulator layer between adjacent elevator shafts. An advantage is that capacity of the elevator arrangement can be increased in a simple way.

In an embodiment, the method comprises providing the upmost elevator shaft element with a machinery for driving moving elevator components and providing the lowest elevator shaft element with a maintenance door for maintenance operations arranged in the elevator shaft. An advantage is that a complete elevator shaft having a commonly used configuration may be constructed.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1A:
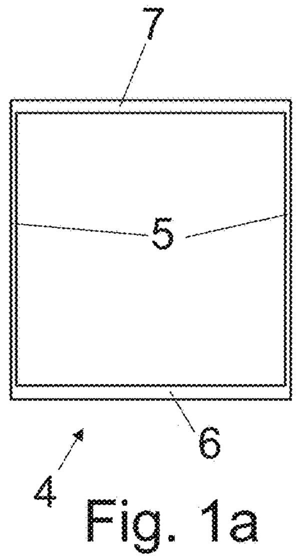
FIG. 1*a* is a schematic end view of a transport and/or storage unit.
Figure 1B:
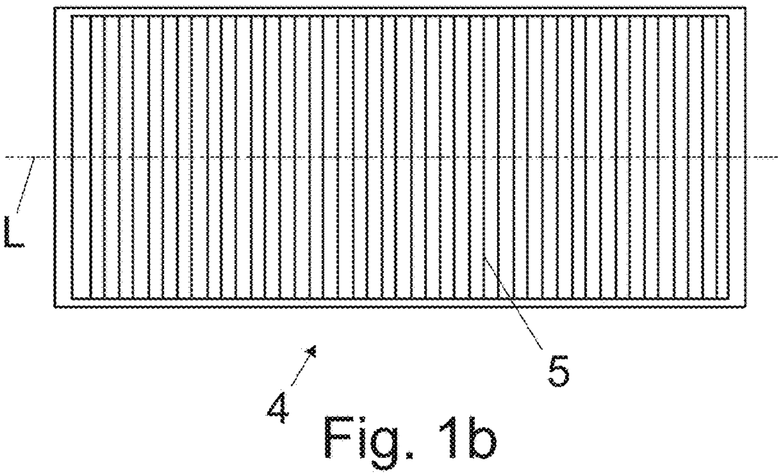
FIG. 1*b* is a schematic side view of the transport and/or storage unit shown in FIG. 1*a,*

FIG. 1*a* is a schematic end view of a transport and/or storage unit, and FIG. 1*b* is a schematic side view of the transport and/or storage unit shown in FIG. 1*a*.

According to an aspect of the invention, an elevator shaft is constructed from at least one element that comprise a frame module.

In an embodiment, the frame module is constructed from a transport and/or storage unit 4 that has a four-cornered cross-section and comprises two side walls 5, a bottom wall 6 and a roof wall 7, and preferably made of metal, such as steel. The outer surface of the side walls 5 may comprise corrugations (as shown in FIG. 1), but this is not an obligatory feature of the unit 4.

In an embodiment, the frame module is constructed from a shipping container. The shipping container may be e.g. an International Standards Organization (ISO) shipping container or some another intermodal container, mostly of ei-ther twenty or forty feet (6.1 or 12.2 m) standard length and having height of 8 feet 6 inches (2.6 m) or 9 feet 6 inches (2.9 m). The latter are known as High Cube or Hi-Cube (HC) containers. It is to be noted, however, that the container may have dimensions varying from those mentioned above.

In an embodiment, the transport and/or storage unit 4 from which the frame module is constructed is a unit of a site hut or another unit intended mainly for residential or office use. In this embodiment, the side walls 5, a bottom wall 6 and/or a roof wall 7 of the unit 4 may comprise openings (for landing door, window etc.) that are closed when the module is prepared for use as the frame module.

Figure 2:
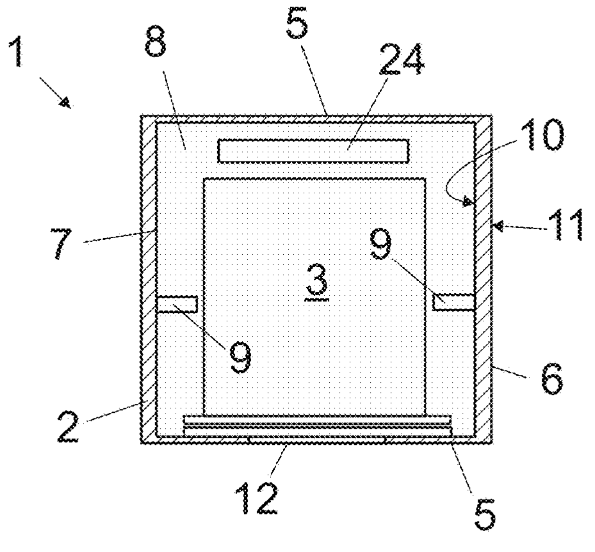
FIG. 2 is a schematic top view of an elevator in partial cross-section.
Figure 3:
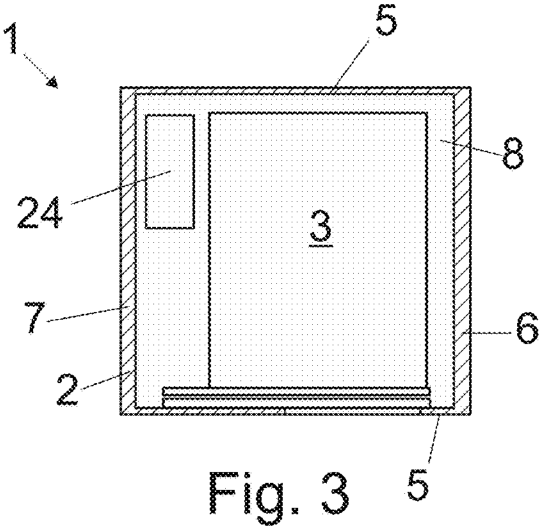
FIG. 3 is a schematic top view of another elevator in partial cross-section.

FIG. 2 is a schematic top view of an elevator in partial cross-section, and FIG. 3 is a schematic top view of another elevator in partial cross-section.

A frame module 2 of an elevator shaft element 1 is constructed from a transport and/or storage unit 4 described above. The unit 4 is arranged vertically such that the side walls 5, bottom wall 6 and upper wall 7 of the unit define an inner space 8 of the elevator shaft.

At least one elevator car guide 9 is attached to the bottom 6 wall and/or roof wall 7 for guiding movement of the elevator car 3 in the elevator shaft element 1. In an embodiment, the elevator car guide 9 is attached directly to the wall.

In another embodiment, the elevator car guide 9 is attached to mounting brackets that are mounted to the wall.

The attachment of the elevator car guide 9 may be realized by e.g. fixation means, such as bolts, or by welding.

The frame module 2 constitutes an inner perimeter 10 of a load bearing structure adapted for bearing the loads caused by operating the elevator. In an embodiment, the frame module 2 also constitutes an outer perimeter 11 of said load bearing structure. Said loads comprise not only loads of normal operating of the elevator, but also loads (often high ones) that incur in an emergency situation when gripping devices are activated for stopping the movement of the elevator car.

In an embodiment, the bottom and roof walls 6, 7 have a thicker, and stronger, structure than the side walls 5.

In an embodiment, such as shown in FIG. 2, the elevator 1 has its counterweight 24 back of the elevator car 3 relative to a door opening 12 made for a landing door, In another embodiment, such as shown in FIG. 3, the counterweight 24 is arranged at side of the elevator car 3. The decision-making about which one of these two embodiments is selected depends on multiple factors.

Figure 4:
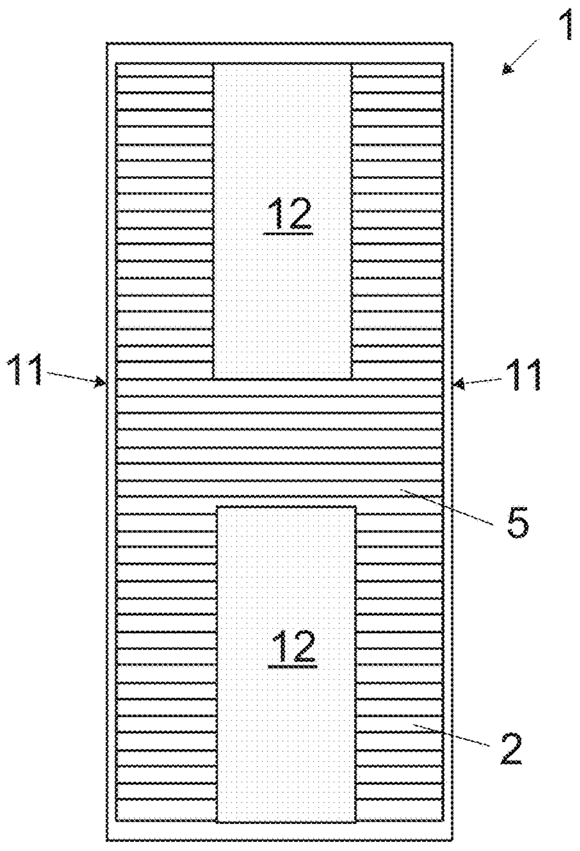
FIG. 4 is a schematic side view of an elevator shaft element.

FIG. 4 is a schematic side view of an elevator shaft element. In an embodiment, the elevator shaft element 1 comprises one or more door openings 12 for a landing door. Said door opening 12 may be arranged on the side walls 5, bottom wall 6 and roof wall 7. In an embodiment, such as shown in FIG. 4, the door opening 12 is arranged on the side wall 5. As the height of the elevator shaft element 1 may extend to height of two or even more floors, it may comprise door openings 12 for landing doors of two or even more floors. In the embodiment shown in FIG. 4, the elevator shaft element 1 comprises door openings 12 for two floors.

Figure 5:
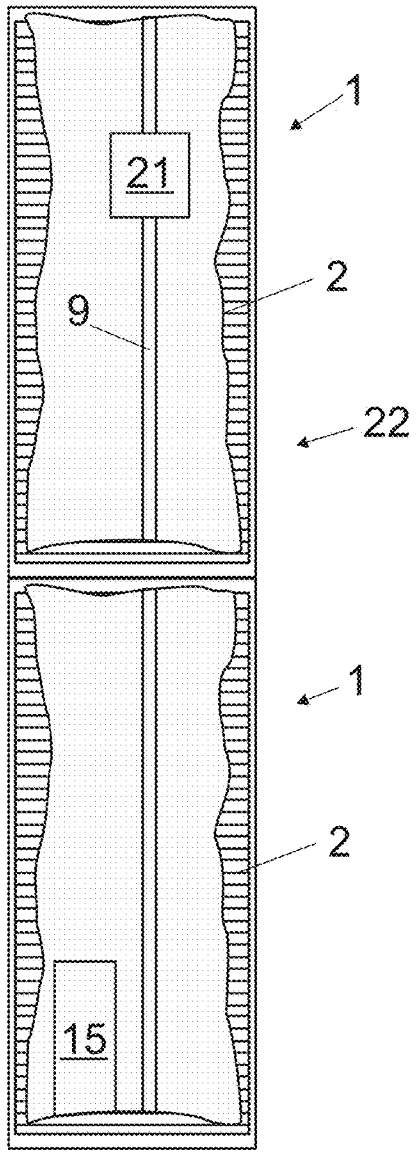
FIG. 5 is a schematic side view of an elevator shaft partially cut open.

FIG. 5 is a schematic side view of an elevator shaft partially cut open. The elevator shaft 22 comprises two elevator shaft elements 1 arranged vertically and attached one on top of the other. In another embodiment, the elevator shaft 22 comprises more than two elevator shaft elements 1 arranged attached one on top of the other. In still another embodiment, the elevator shaft comprises just one elevator shaft element 1.

In an embodiment, such as shown in FIG. 5, all the elevator shaft elements 1 of the elevator shaft have an equal length. However, this is not always necessary; in other words, the elevator shaft 22 may comprise longer and shorter elevator shaft elements 1, constructed from e.g. a suitable mixture of twenty- and forty-feet shipping containers.

In an embodiment, the elevator shaft element 1 that is arranged upmost in the elevator shaft 22 comprises a machinery 21 for driving moving elevator components. The machinery 21 comprises an electric motor and a traction sheave driven by means of the electric motor. The moving elevator components comprises at least an elevator car, but typically also a counterweight.

In an embodiment, the upmost elevator shaft element 1, or at least an upmost section thereof, creates an upper machine room, where the machinery 21 is arranged in. In another embodiment, the elevator is a so-called machine room less elevator or a low headroom elevator. In the low headroom elevator, the machinery 21 is typically attached to the elevator car guide 9.

In an embodiment, the elevator shaft element 1 that is arranged lowest in the elevator shaft 22 comprises a maintenance door 15. The maintenance door 15 allows maintenance personnel to get in the inner space of the elevator shaft for e.g. carrying out maintenance operations. In an embodiment, elevator shaft element 1 comprises the maintenance door 15 and at least one door opening 12 for a landing door, preferably arranged so that the maintenance door is on opposite side of the elevator shaft element in relation to the at least one door opening.

In an embodiment, the lowest elevator shaft element 1 is arranged to create a low pit that comprises a refuge space required e.g. by standards EN 81-20 and EN 81-50.

Figure 6:
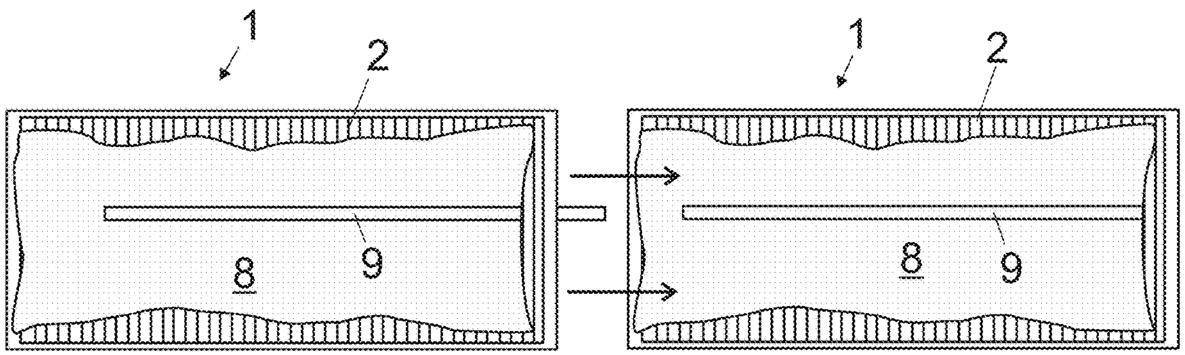
FIG. 6 is a schematic side view of a method.

FIG. 6 is a schematic side view of a step of a method for creating an elevator shaft. In this step, two elevator shaft elements 1 are to be connected to each other. In some embodiments, this is all what is needed for creating an elevator shaft having the required length. In some other embodiments, at least one more elevator shaft element 1 is connected in the two elements shown in FIG. 6 in order to establish an elevator shaft so that the required length for the elevator shaft is reached.

End walls or end doors of the frame modules 2 are removed prior to connection of the elevator shaft elements 1, at least at the ends that are connected to each other. In an embodiment, end walls or end doors are removed from both ends of the element.

Openings needed for doors, windows etc. are made in the frame module by e.g. cutting or flame cutting.

In an embodiment of the method, the elevator shaft 22 or at least a section thereof comprising at least two elevator shaft elements 1 is pre-assembled in a plant, factory, manufacturing site or assembly plant, preferably indoors. In this embodiment, said elevator shaft elements 1 are temporarily arranged one after another in an order and position corresponding to an order and position of the elevator shaft elements 1 in a final building site of the elevator shaft 22.

In an embodiment of the pre-assembling, the elevator shaft elements 1 are fixed to each other, e.g. by similar means as in the final construction site. In another embodiment, it is used some other fixation methods or means, preferably allowing quick and easy disassembly of the elements.

In an embodiment of the pre-assembling, at least one assembly work step is carried out in the elevator shaft elements 1. For example, the elevator car guides 9 of at least two elevator shaft elements may be matched or vertically aligned to each other. Additionally or alternatively, other assembly work step(s) may be carried out, such as adding machinery components, doors, pulleys, ropings (e.g. on reels or pulleys), etc. Additionally, an elevator car can be arranged in the elevator shaft element in the pre-assembling.

Following the pre-assembling, the elevator shaft or the elements fixed to each other are disassembled into individual elements for transportation to the building site.

Figure 7:
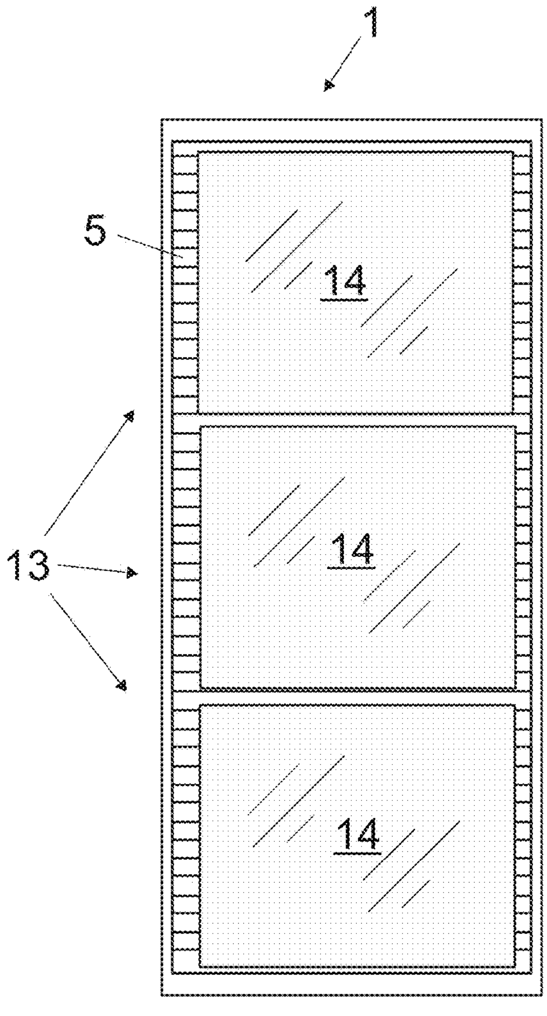
FIG. 7 is a schematic side view of another elevator shaft element.

FIG. 7 is a schematic side view of another elevator shaft element. In an embodiment, at least one of the side walls 5 comprises at least one opening 13 for receiving a window 14. Thus, if also the elevator car is provided with window(s), a scenic elevator can be realized.

In an embodiment, the elevator shaft is arranged inside the building. In another embodiment, the elevator shaft is arranged on outer wall of the building. In a third embodiment, the elevator shaft is arranged at a distance from the building and connected to said building by access bridges (not shown). The access bridges connect the landing doors of the elevator to the floors of the building. The third embodiment makes it possible to realize an outstandingly impressive scenic elevator.

Figure 8A:
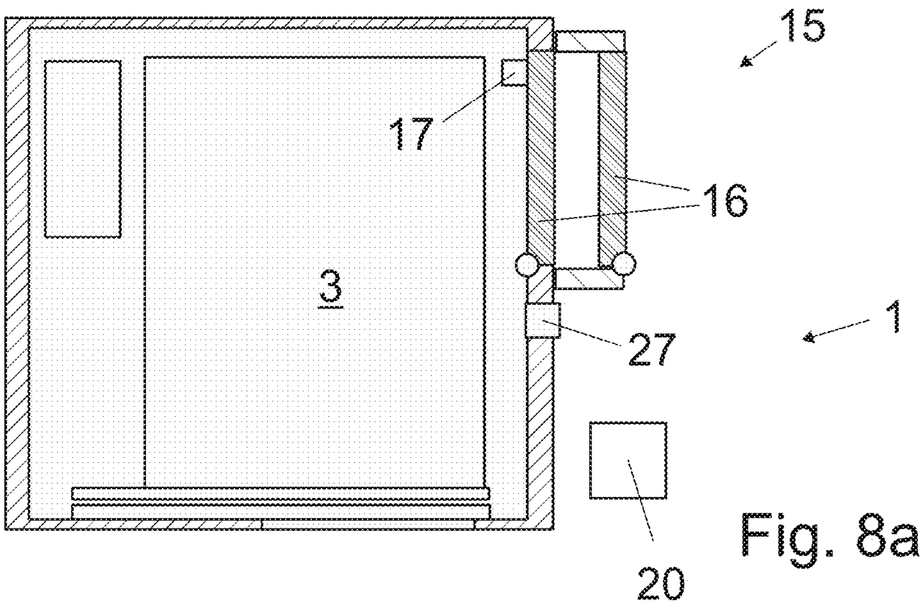
FIG. 8*a* is a schematic top view of a third elevator in partial cross-section.
Figure 8B:
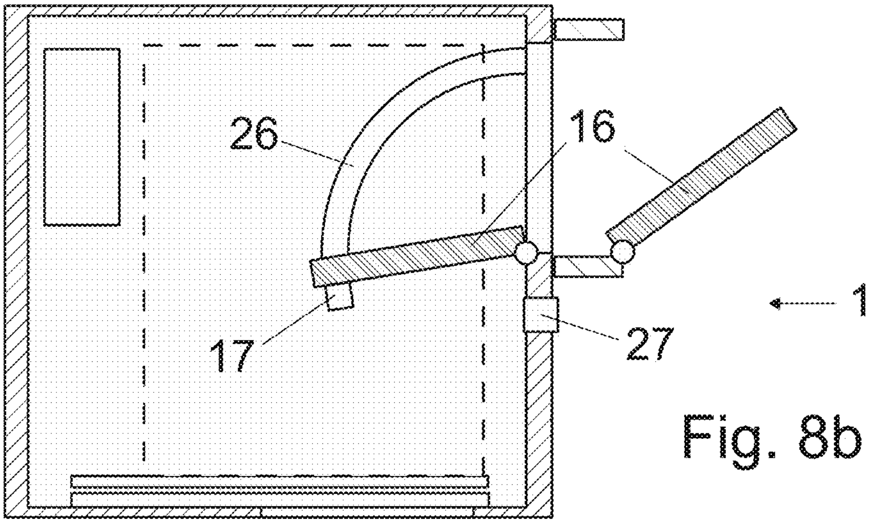
FIG. 8*b* is another schematic top view of the elevator shown in FIG. 8*a,*
Figure 8C:
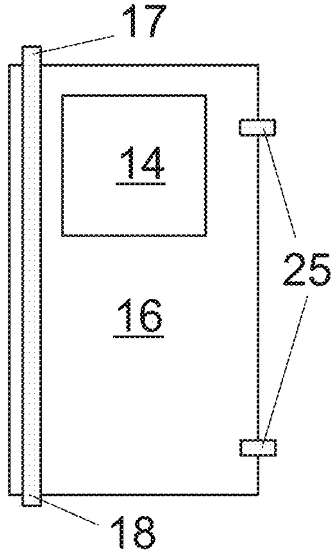
FIG. 8*c* is a schematic side view of a door of the elevator shown in FIG. 8*a,*

FIG. 8*a* is a schematic top view of a third elevator in partial cross-section, FIG. 8*b* is another schematic top view of the elevator shown in FIG. 8*a*, and FIG. 8*c* is a schematic side view of a door of the elevator shown in FIG. 8*a*.

As already mentioned, the elevator shaft element 1 may comprise a maintenance door 15 for maintenance operations to be carried out in the elevator shaft.

In an embodiment, the maintenance door 15 comprises a door leaf 16 opening inwards, outwards or in both directions in respect of the elevator shaft element 1.

In an embodiment, such as shown in FIG. 8*a*, the maintenance door 15 comprises two door leafs 16, a first or outmost thereof is arranged to open outwards whereas a second or innermost door leaf is arranged to open inwards. It is to be noted that the outmost door leaf is drawn at a distance from outer side of the outer periphery of the frame module for clarity reasons. The outmost door leaf may be arranged e.g. in flush with the outer periphery.

In an embodiment, the door leaf 16 opening inwards is provided with a buffer 17 that extends vertically over the upper end of the door leaf, as can be seen in FIG. 8*c*. The door leaf 16 may be dimensioned for carrying loads caused by the elevator car 3 moving downwards, for instance by the nominal speed thereof and loaded by 120% of the nominal load thereof.

In an embodiment, hinges 25 of the door are dimensioned to stand the loads caused by the elevator car 3, but preferably the door leaf 16 is provided not only with the buffer 17 but also with a support element 18, or a buffer foot, that is arranged to support the door leaf 16 against a bottom structure of the elevator shaft. Thus, the support element 18 may transmit loads focused in the buffer 17 directly to the bottom structure.

In an embodiment, the maintenance door 15 is connected with a safety control system 20 that is arranged for keeping maintenance personnel working in a bottom of the elevator shaft safe. In an embodiment, the safety control system 20 is arranged for prohibiting the elevator car to move when the maintenance door 15 is open or opened.

In an embodiment, the elevator shaft element 1 is provided with a safety control user interface 27 that is arranged e.g. on outer perimeter of the elevator shaft element 1 and that is operable from outside the elevator shaft element 1. In an embodiment, this user interface 27 can be used for opening a locking system of the maintenance door 15. The user interface 27 is connected to the locking system e.g. by a mechanically or hydraulically operable connection or electrically. The safety control user interface 27 may be linked to the safety control system 20 so that the elevator car 3 can not move when said locking system is open.

In an embodiment, such as shown in FIGS. 8*a*, 8*b*, the user interface 27 is arranged near of the maintenance door 15. However, other solutions are possible: the user interface 27 may be arranged e.g. near a lowest landing door or separate from the frame module 2, for instance.

In an embodiment, the user interface 27 is arranged to open the locking system of the door 15 and turn the door leaf(s) 16 to open and close positions. Preferably, the user interface 27 is the only means for moving the door leaf(s), i.e. moving of the door leaf(s) 16 by pushing/pulling thereof is prohibited. In other words, the door cannot be opened or closed from the door leaf(s), but only by using the user interface 27. Thus, the door leaf 16 is preferably devoid of any door handle etc. An advantage is that risk for closing the door unintentionally may be minimized.

In an embodiment, the lowest landing door is not possible to be opened from the floor side when the elevator car does not lie at said landing door.

In an embodiment, the lowest landing door comprises an emergency opening system that is arranged inside the elevator shaft, i.e. in the inner space of the elevator. The emergency opening system makes it possible to open the lowest landing door from the inner space in case of emergency situations.

It is to be noted here that the maintenance door 15 together with the safety systems described in this description makes it possible to realize a safe low pit using the elevator shaft elements 1. However, also elevators having a conventional bottom room can be realized safely with the elevator shaft elements 1.

Figure 9A:
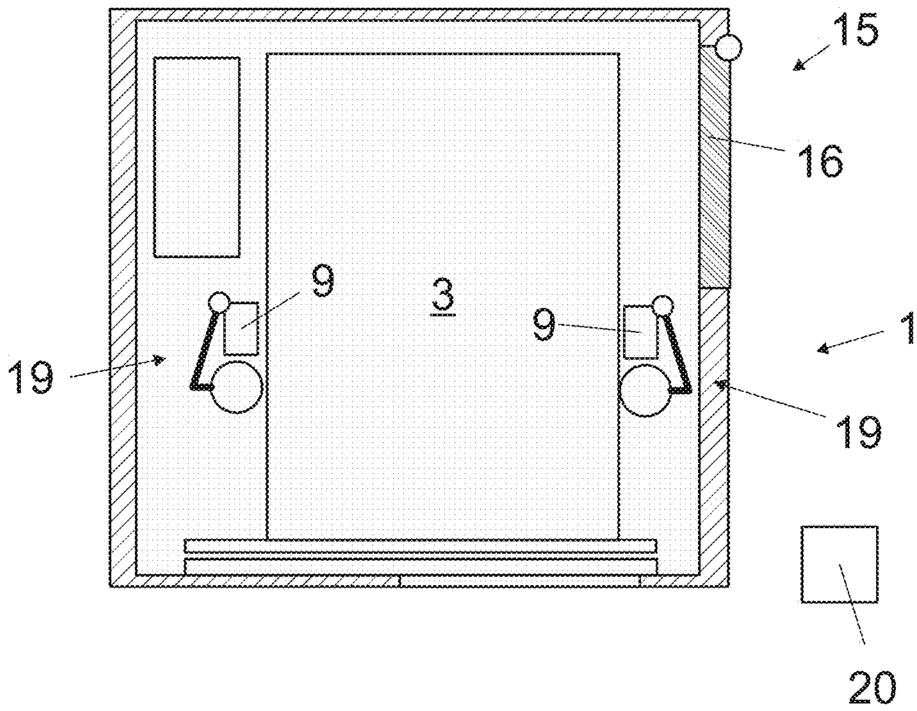
FIG. 9*a* is a schematic top view of a fourth elevator in partial cross-section.
Figure 9B:
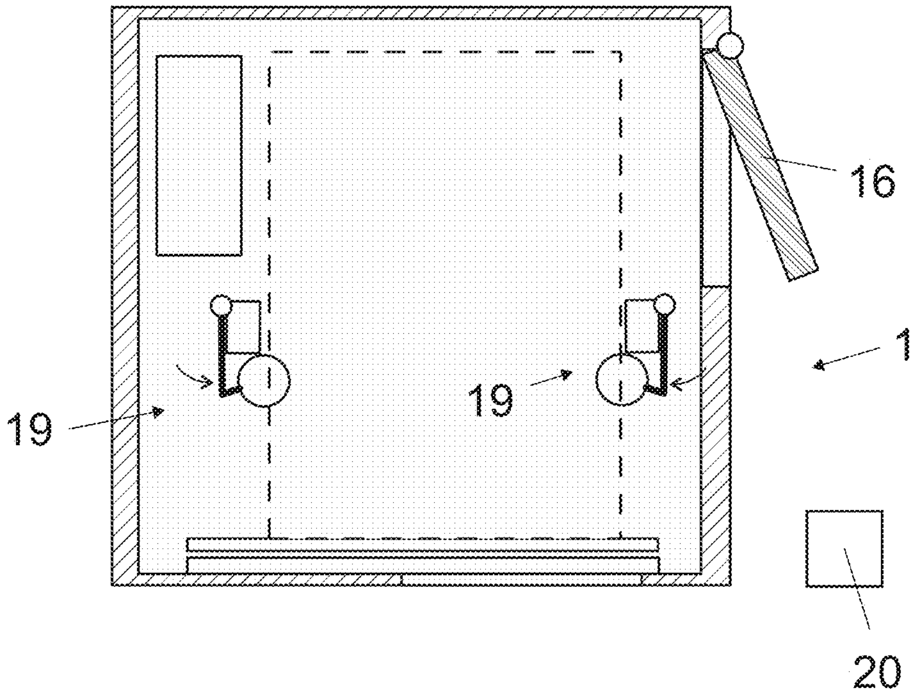
FIG. 9*b* is another schematic top view of the elevator shown in FIG. 9*a,*

FIG. 9*a* is a schematic top view of a fourth elevator in partial cross-section, and FIG. 9*b* is another schematic top view of the elevator shown in FIG. 9*a*.

In an embodiment, the elevator shaft element 1 comprises a safety buffer arrangement 19 that is arranged to be moved (from a position shown in FIG. 9*a*) on movement path of the elevator car 3 (this position shown in FIG. 9*b*) when activated by a safety control system 20. Said activation may take place e.g. when the maintenance door 15 is opened or open. The safety buffer arrangement 19 is arranged for prohibiting the elevator car to move in the pit or the bottom part of the elevator shaft when the maintenance personnel is potentially working there.

Figure 10:
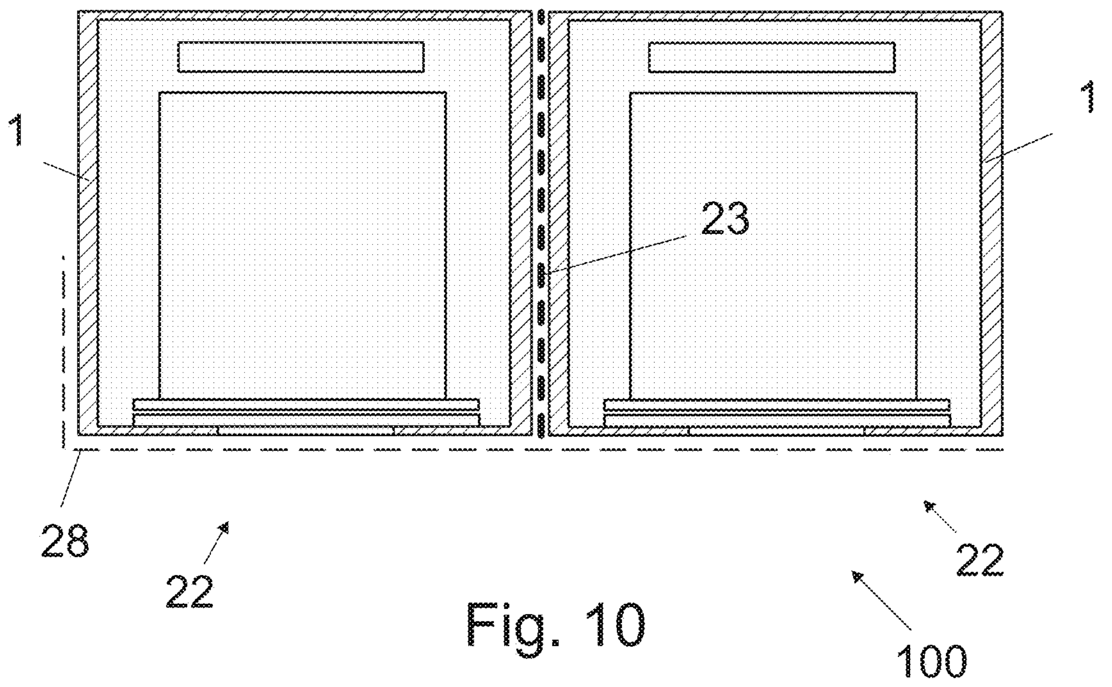
FIG. 10 is a schematic top view of a fifth elevator in partial cross-section.

FIG. 10 is a schematic top view of a fifth elevator in partial cross-section. In an embodiment, the elevator arrangement 100 comprises two or more elevator shafts 22 arranged side by side to form an elevator group. An advantage of the elevator group is that it can be arranged to have a common group control system. In an embodiment, there is at least one insulator layer 23 arranged between adjacent elevator shafts 22. The insulator layer(s) may comprise e.g. sound-absorbing material, vibration-damping material and/or fire protection material.

In an embodiment, a lining 28 is arranged to cover at least partly the outer perimeter of the elevator shaft. The lining 28 may have just a decorative or architectural purpose, but it may also serve in some functional or safety purposes.

In an embodiment of the elevator arrangement comprising two or more elevator shafts, the arrangement comprises at least one elevator car configured for passenger transportation and at least one elevator car configured for goods transportation. In an embodiment, the elevator car configured for goods transportation is used e.g. during construction or renovation of a building and reconfigured to passenger transportation as the goods transportation is no longer needed.

In an embodiment, the elevator car configured for goods transportation comprises an opening in a roof or floor thereof or has no roof at all. This way it is possible to transport long items in the elevator car—longer than the height of the elevator car.

Figure 11:
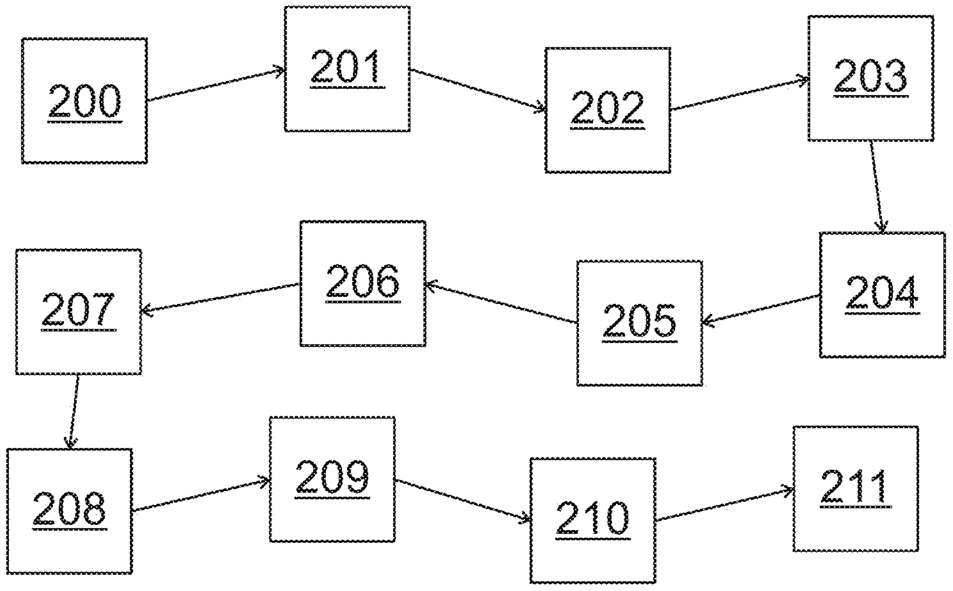
FIG. 11 illustrates a method for constructing an elevator shaft.

FIG. 11 illustrates a method for constructing an elevator shaft. In the method, it is prefabricated 200 elevator shaft elements 1 that comprise a frame module 2. The frame module 2 is constructed from a transport and/or storage unit 4 comprising side walls 5, a bottom wall 6 and a roof wall 7.

In an embodiment, the method comprises removing 201 an end wall of the transport and/or storage module at least in an end to be connected to another transport and/or storage module.

In an embodiment, the method comprises making 202 one or more door openings on at least one of the side walls, bottom and roof walls, preferably on one of the side walls, and optionally arranging a door leaf in the door opening.

Elevator car guides 9 are attached 203 to the bottom and/or roof walls 6, 7 for guiding an elevator car 3 to move in a longitudinal direction L (shown in FIG. 1*b*) of all the side walls, bottom wall and roof wall 5, 6, 7.

In an embodiment, the method comprises making 204 at least one opening for a window on at least one of the side walls, and optionally arranging a window element in said opening.

In an embodiment, the method comprises performing a preliminary assembling 205 of the elevator shaft in a plant, factory, manufacturing site or assembly plant, the preliminary assembling comprising arranging at least two of said number of the elevator shaft elements one after another, carrying out at least one assembly work step in the elevator shaft elements, and disassembling the at least two of said number of the elevator shaft elements for transportation to a building site.

In an embodiment, the step performing a preliminary assembling 205 comprises vertical alignment 206 of the elevator car guides of the at least two elevator shaft elements to each other. The "vertical alignment" does not necessitate that the at least two elevator shaft elements are in vertical position, i.e. in the position of the elevator shaft; alternatively, the at least two elevator shaft elements connected to each other may be e.g. in horizontal position during the vertical alignment 206.

In an embodiment, the upmost elevator shaft element is provided 207 with a machinery for driving moving elevator components.

In an embodiment, the lowest elevator shaft element is provided 208 with a maintenance door for maintenance operations arranged in the elevator shaft.

Finally, the method comprises, on the building site, arranging 209 a number of the elevator shaft elements 1 one after another until the required length for the elevator shaft 22 has been reached.

In an embodiment of the method, it is arranged 210 at least two elevator shafts side by side and fitted 211 at least one insulator layer between adjacent elevator shafts.

It is to be noted that the order of the method steps may deviate from the order described above.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 elevator shaft element
2 frame module
3 elevator car
4 transport and/or storage unit
5 side wall
6 bottom wall
7 roof wall
8 inner space
9 elevator car guide
10 inner perimeter
11 outer perimeter
12 door opening
13 window opening
14 window
15 maintenance door
16 door leaf
17 buffer
18 support element
19 safety buffer arrangement
20 safety control system
21 machinery
22 elevator shaft
23 insulator layer
24 counterweight
25 hinge
26 runway
27 safety control user interface
28 lining
100 elevator arrangement
200-211 method steps
L longitudinal direction

The invention claimed is:

1. An elevator shaft element, comprising a frame module arranged for receiving an elevator car therein, the frame module comprising side walls, a bottom wall and a roof wall of an intermodal container unit, the intermodal container unit arranged to be positioned vertically such that said side walls, bottom wall and roof wall of the intermodal container unit extend vertically and define an inner space of an elevator shaft, a door opening arranged in one of the side walls of the intermodal container unit, and elevator car guides for guiding movement of the elevator car in the elevator shaft element, said elevator car guides attached to said bottom wall and/or roof wall of the intermodal container unit, and said bottom and/or roof wall having a thicker structure than the side walls.

2. The elevator shaft element as claimed in claim 1, wherein the frame module is arranged to constitute an inner perimeter and an outer perimeter of a load bearing structure adapted for bearing loads caused by operating the elevator car.

3. The elevator shaft element as claimed in claim 1, comprising a maintenance door for maintenance operations to be carried out in the elevator shaft.

4. The elevator shaft element as claimed in claim 3, wherein the maintenance door comprises a door leaf opening inwards and/or outwards in respect of the elevator shaft element.

5. The elevator shaft element as claimed in claim 4, wherein the door leaf is arranged to open at least inwards, and that the door leaf is provided with a buffer that extends vertically over an upper end of the door leaf, and a support element that is arranged to support the door leaf against a bottom structure of the elevator shaft, and wherein the door leaf is dimensioned for carrying loads caused by the elevator car moving downwards by a nominal speed thereof and loaded by 120% of a nominal load thereof.

6. The elevator shaft element as claimed in claim 1, comprising a safety buffer arrangement arranged to be moved on movement path of the elevator car when activated by a safety control system.

7. The elevator shaft element as claimed in claim 1, comprising a machinery for driving moving elevator components, said moving elevator components comprising at least the elevator car.

8. The elevator shaft element as claimed in claim 7, wherein said machinery is attached to the elevator car guides.

9. An elevator arrangement, comprising the elevator shaft, comprising at least two elevator shaft elements as claimed in claim 1 attached one on top of the other.

10. The elevator arrangement as claimed in claim 9, comprising the at least two elevator shafts arranged side by side, and, optionally, at least one insulator layer arranged therebetween.

11. The elevator arrangement as claimed in claim 9, comprising an elevator shaft element from among the at least two elevator shaft elements comprising a machinery for driving moving elevator components as an upmost elevator shaft element, and an elevator shaft element from among the at least two elevator shaft elements comprising a maintenance door for maintenance operations carried out in the elevator shaft as a lowest elevator shaft element.

12. The elevator shaft element as claimed in claim 1, wherein the door opening is created by cutting an opening in the one of the side walls.

13. A method for constructing an elevator shaft, the method comprising prefabricating elevator shaft elements, the elements comprising a frame module comprising side walls, and a bottom wall and a roof wall of an intermodal container unit, arranging the intermodal container unit to be positioned vertically with the side walls, the bottom walls and the roof walls extending vertically to define an inner space of the elevator shaft, forming a door opening in one of the side walls of the intermodal container unit, attaching elevator car guides to said bottom and/or roof walls of the intermodal container unit for guiding an elevator car to move in longitudinal direction (L) of all the side walls, the bottom wall and the roof wall, said bottom and/or roof walls of the intermodal container unit having a thicker structure than the side walls, and arranging a number of said elevator shaft elements one after another until a required length for the elevator shaft has been reached.

14. The method as claimed in claim 13, comprising removing an end wall of the intermodal container unit at least in an end to be connected to another intermodal container unit.

15. The method as claimed in claim 13, comprising performing a preliminary assembling of the elevator shaft in a plant, factory, manufacturing site or assembly plant, the preliminary assembling comprising arranging at least two of said number of the elevator shaft elements one after another, carrying out at least one assembly work step in the elevator shaft elements, and disassembling the at least two of said number of the elevator shaft elements for transportation to a building site.

16. The method as claimed in claim 13, comprising providing an upmost elevator shaft element from among the number of elevator shaft elements with a machinery for driving moving elevator components, and providing a lowest elevator shaft element from among the number of elevator shaft elements with a maintenance door for maintenance operations arranged in the elevator shaft.

17. The method as claimed in claim 13, further comprising cutting one or more openings from at least one of the side walls, the bottom wall and the roof wall.

* * * * *